(12) United States Patent
Jiang

(10) Patent No.: US 7,528,586 B2
(45) Date of Patent: May 5, 2009

(54) HARMONICS RELATED SYNCHRONIZATION FOR SWITCHING REGULATORS

(75) Inventor: Dongwen Jiang, Singapore (SG)

(73) Assignee: Honeywell International Inc., Morristown, NJ (US)

( * ) Notice: Subject to any disclaimer, the term of this patent is extended or adjusted under 35 U.S.C. 154(b) by 454 days.

(21) Appl. No.: 11/312,505

(22) Filed: Dec. 21, 2005

(65) Prior Publication Data

US 2007/0139026 A1    Jun. 21, 2007

(51) Int. Cl.
G05F 1/40 (2006.01)
(52) U.S. Cl. ...................................... 323/282
(58) Field of Classification Search .............. 323/267, 323/268, 271, 282; 363/71, 72
See application file for complete search history.

(56) References Cited

U.S. PATENT DOCUMENTS

| 5,537,305 A | 7/1996 | Colotti |
| 5,552,643 A * | 9/1996 | Morgan et al. ............... 307/81 |
| 5,973,485 A * | 10/1999 | Kates et al. .................. 323/272 |
| 5,995,390 A | 11/1999 | Otake |
| 6,809,678 B2 * | 10/2004 | Vera et al. .................... 341/166 |
| 6,943,535 B1 * | 9/2005 | Schiff .......................... 323/246 |
| 7,010,271 B2 | 3/2006 | Melanson |
| 7,265,522 B2 * | 9/2007 | Sutardja et al. ............. 323/222 |

* cited by examiner

Primary Examiner—Matthew V Nguyen
(74) Attorney, Agent, or Firm—Fogg & Powers LLC

(57) ABSTRACT

Disclosed is a system and method for synchronizing switching regulators in an electronic system so that switching interference from the regulators may be kept from a given spectral region of interest. The system does this by selecting a fundamental frequency such that each of the switching frequencies corresponding to each of the switching regulators is a harmonic of the fundamental frequency. Further, the fundamental frequency is selected so that none of the switching regulators, each of which are driven by an harmonic of the fundamental frequency, generates switching interference in the spectral region of interest. Each of the switching regulators has a synchronization clock, which multiplies or divides the master clock frequency by an allocated harmonic factor. Each harmonic factor is selected to that the switching frequency is within the operating range of the particular switching regulator.

20 Claims, 3 Drawing Sheets

HARMONICS RELATED SYNCHRONIZATION FOR SWITCHING REGULATORS

BACKGROUND OF THE INVENTION

1. Field of the Invention

The present invention involves electronic systems employing switching regulators and power supplies. More particularly, the present invention involves electronic systems for driving switching regulators that are employed in line noise-sensitive applications.

2. Discussion of the Related Art

Switching regulators and power supplies are commonly used in electronic systems, due to advantages such as low power dissipation, efficiency, and mass. Further, switching regulators and power supplies can provide stable voltages in the presence of a noisy line voltage.

A disadvantage of switching regulators is that they generate noise, both conducted and emitted, due to the physical switching operation itself, which is referred to as switching interference. Switching interference generally has a fundamental frequency component, which corresponds to the switching frequency of the switching regulator, and a plurality of harmonic components, which correspond to harmonics of the fundamental frequency component.

Many electronic systems, including avionics systems, employ multiple switching regulators, each of which may perform different functions (e.g., power regulation and power conversion) Each of these multiple switching regulators may have a different, corresponding switching frequency, depending on its function, the amount of power it must provide, its performance requirements, as well as other factors. Accordingly, each switching regulator may generate switching interference such that each has a distinct fundamental frequency component and a distinct spectrum of harmonic components. The switching interference generated by each switching regulator may be spectrally broad and unrelated to the switching interference generated by the other switching regulators.

Certain electronic devices and/or systems may have one or more spectral regions of interest where switching interference is particularly problematic. Examples include radio frequency (RF) receivers and driver circuitry for electro-optic devices, such as cameras or sensors. Accordingly, spectrally broad and unrelated switching interference may interfere with the function of such electronic devices and/or systems.

Related art solutions to switching interference include the use of filters and shielding. However, these solutions have undesirable consequences in that they increase the size, mass, and complexity of the electronic system in which they are deployed.

Accordingly, there is a need to control switching regulators that operate in a line noise-sensitive environments so that the noise is at least mitigated in the spectral regions of interest.

SUMMARY OF THE INVENTION

Accordingly, the present invention is directed to harmonics related synchronization for switching regulators in order to substantially obviate one or more of the problems due to the limitations and disadvantages of the related art.

An advantage of the present invention is that it improves the performance of electronic devices and/or systems that use or operate in the same environment as one or more switching regulators.

Another advantage of the present invention is that it reduces the size, mass, and complexity of electronic devices and/or systems that use switching regulators.

Additional features and advantages of the invention will be set forth in the description which follows, as well as the appended drawings. In accordance with one aspect of the present invention, these and other advantages are achieved by an electronic system. The electronic system comprises a plurality of switching regulators; a plurality of synchronization clocks connected to the plurality of switching regulators, each of the plurality of synchronization clocks having a harmonic factor; and a master clock connected to the plurality of synchronization clocks, the master clock having a fundamental frequency, wherein the fundamental frequency and each of the plurality of harmonic factors are selected wherein each of the plurality of synchronization clocks generates substantially no switching interference within a spectral region of interest.

In another aspect of the present invention, the aforementioned advantages are achieved by a method for synchronizing a plurality of switching regulators. The method comprises selecting a master clock frequency; selecting a plurality of harmonic factors corresponding to the plurality of switching regulators; and applying a plurality of clock signals to the corresponding plurality of switching regulators, wherein each of the plurality of clock signals is based on the master clock frequency and the corresponding harmonic factor, and wherein the master clock frequency and the plurality of harmonic factors are selected so that substantially no switching interference occurs within a spectral region of interest.

In another aspect of the present invention, the aforementioned advantages are achieved by a computer readable medium encoded with software for synchronizing switching regulators. The computer readable medium comprises a program for selecting a master clock frequency; a program for selecting a plurality of harmonic factors corresponding to the plurality of switching regulators; and a program for applying a plurality of clock signals to the corresponding plurality of switching regulators, wherein each of the plurality of clock signals is based on the master clock frequency and the corresponding harmonic factor, and wherein the master clock frequency and the plurality of harmonic factors are selected so that substantially no switching interference occurs within a spectral region of interest.

In another aspect of the present invention, the aforementioned advantages are achieved by a system for synchronizing a plurality of switching regulators. The system comprises means for selecting a master clock frequency; means for selecting a plurality of harmonic factors corresponding to the plurality of switching regulators; and means for applying a plurality of clock signals to the corresponding plurality of switching regulators, wherein each of the plurality of clock signals is based on the master clock frequency and the corresponding harmonic factor, and wherein the master clock frequency and the plurality of harmonic factors are selected so that substantially no switching interference occurs within a spectral region of interest.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
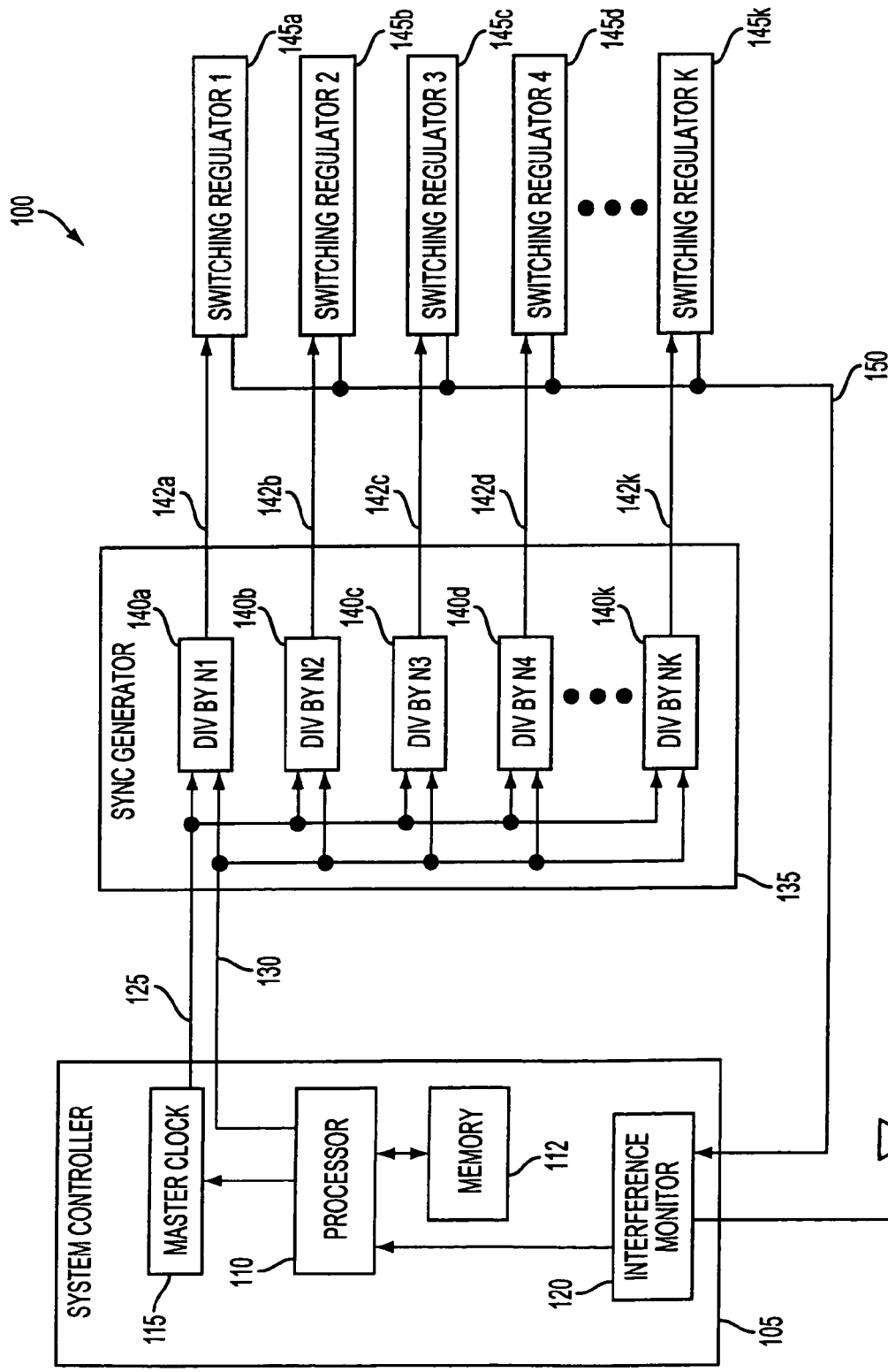
FIG. 1 illustrates a first exemplary system for synchronizing switching regulators.

FIG. 1 illustrates a first system 100 for harmonically synchronizing switching regulators within an electronic device or system. As used herein, harmonic synchronization refers to selecting a fundamental frequency such that each of the switching regulators in system 100 is provided a clock signal that is a harmonic of the fundamental frequency. Each clock signal is an integer multiplier/divisor of the fundamental frequency. The fundamental frequency and each multiplier/divisor are selected so that the total switching noise spectra conducted and/or emitted by the switching regulators has substantially no spectral components within a given spectral region of interest of the electronic device or system in which system 100 is employed.

As illustrated in FIG. 1, system 100 includes a system controller segment 105 having a processor 110, a memory 112 connected to processor 110, a master clock 115, and an interference monitor 120. System 100 further includes a sync generator segment 135 having a plurality of k synchronization clocks 140a-140k, and a plurality of k switching regulators 145a-145k corresponding to synchronization clocks 140a-k.

Master clock 115 is connected to synchronization clocks 140a-140k by a master clock signal line 125. Processor 110 and synchronization clocks 140a-140k are connected by a harmonic allocation signal line 130. Harmonic allocation signal line 130 may include a plurality of k signals lines, one per synchronization clock 140a-140k.

As used herein, "connected" refers to being able to communicate via electronic signals. Accordingly, two connected components may have at least one intervening component connected between them.

Synchronization clocks 140a-k each include a digital divider, which divides the fundamental frequency $f_0$ the master clock signal (via master clock signal line 125) by an integer value (hereinafter "harmonic factor") provided by processor 110 via harmonic allocation signal line 130. Each digital divider may be implemented using a binary counter.

Processor 110 may include or operate in conjunction with one or more processors or microcontrollers, which may be co-located with other components of system 100 or remotely located and connected to system 100 through a network connection. Processor 110 is connected to a memory 112, which may be integrated into processor 110, may be co-located with processor 110, or may be remotely located and connected to processor 110 over a network connection. It will be readily apparent to one of ordinary skill that various architectures for processor 110 and memory 112 are possible and within the scope of the invention.

Interference monitor 120 may include a spectrum analyzer, which may further include one or more hardware components, such as analog/digital (A/D) converters and application specific integrated circuits (ASICs). Interference monitor 120 may be implemented all or in part in software stored in memory 112 and executed by processor 110. Output sensor signal line 150 connects the outputs of switching regulators 145a-k to interference monitor 120. Each of switching regulators 145a-k may have an amplifier (not shown) that converts its output signal into a voltage appropriate for the dynamic range of interference monitor 120.

Interference monitor 120 may also have an RF receiver, which is connected to a sensing antenna 155. Sensing antenna 155 may be positioned where it can effectively sense the switching interference emitted by switching regulators 145a-k. Further, interference monitor 120 may have more than one sensing antenna 155.

Each of switching regulators 145a-k may be a regulator, power supply, amplifier, etc. Switching regulators 145a-k are respectively connected to synchronization clocks 140a-k by clock signal lines 142a-k. Each of switching regulators 145a-k has a corresponding operating frequency range, whereby each of switching regulators 145a-k receives a respective clock signal (via clock signal lines 142a-k) that has a switching frequency within the respective operating frequency range.

Figure 2:
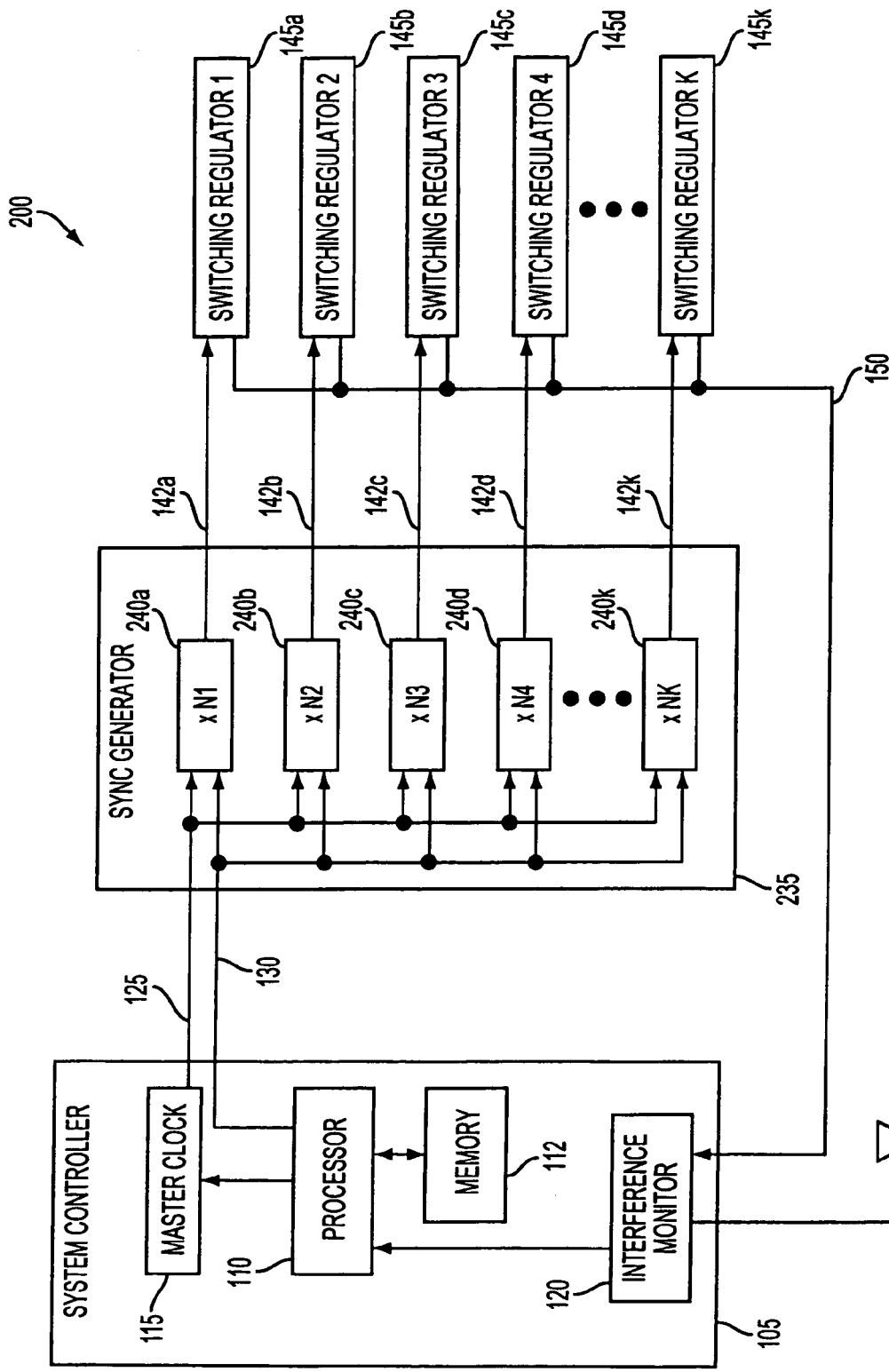
FIG. 2 illustrates a second exemplary system for synchronizing switching regulators.

FIG. 2 illustrates a second system 200, which is substantially similar to system 100, except that synchronization clocks 240a-k each include a digital multiplier, which multiplies the fundamental frequency $f_0$ of the master clock signal (via master clock signal line 125) by a harmonic factor provided by processor 110 via harmonic allocation signal line 130. Each digital multiplier may be implemented as a phase-locked loop circuit, which may include a phase discriminator, a low-pass filter, a voltage controlled oscillator, and a digital divider. The digital divider divides the output of the digital multiplier by the corresponding harmonic factor, which is then fed back to the input of the phase-locked loop circuit along with the master clock signal. One skilled in the art will readily recognize that different implementations for the digital multiplier are possible and within the scope of the invention.

Figure 3:
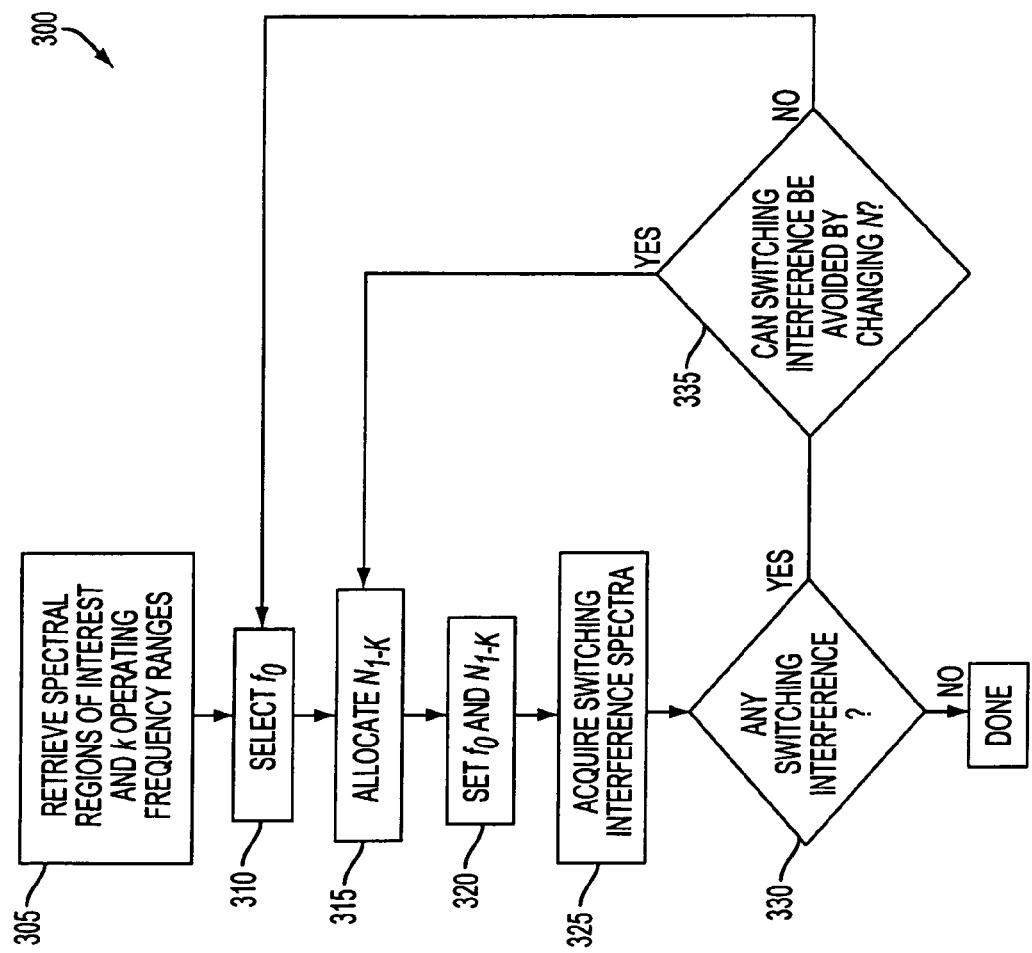
FIG. 3 illustrates an exemplary process for synchronizing switching regulators.

FIG. 3 illustrates an exemplary process 300 for harmonically synchronizing switching regulators in accordance with the present invention. Although, process 300 is described herein with reference to corresponding features in system 200, it will be readily apparent to one of ordinary skill that process 300 equally applies to system 100. Process 300 may be implemented in software, hardware, firmware, or a combination thereof. For the purposes of illustration only, process 300 will be described in terms of software stored in memory 112.

Referring again to FIG. 3, in step 305, the software retrieves the spectral regions of interest from memory 112. This information may include a set of boundary frequencies (high and low) for each spectral region of interest. The spectral regions of interest may be based on the operation of the electronic device of system in which system 100 is employed. For example, if the electronic system or device receives an RF signal at a specific frequency, the spectral region of interest may surround this frequency. As such, the spectral region around this receive frequency may be stored in the form of an upper boundary frequency, a lower boundary frequency, and a permissible noise amplitude. Another way of storing the spectral regions of interest may involve storing frequencies to be used by the electronic device or system, along with their respective amplitudes.

Further to step 305, the software retrieves the operating frequency ranges for each of the switching regulators 145a-k. The data values corresponding to the spectral regions of interest and operating frequency ranges may be derived and loaded into memory 112 as part of a system configuration process done at the factory.

In step 310, the software selects a fundamental frequency $f_0$ for the master clock signal. In doing so, the software may select the fundamental frequency $f_0$ randomly. Alternatively, an initial guess of fundamental frequency $f_0$ may be provided at based on the operating frequencies of switching regulators 145a-k.

In step 315, the software allocates a harmonic factor $N_i$ for each $i^{th}$ of switching regulators 145a-k. Each harmonic factor $N_i$ is an integer multiplier which, when multiplied by fundamental frequency $f_0$, yields a switching frequency $N_i \cdot f_0$ that is within the operating frequency range of the $i^{th}$ switching regulator. Multiple harmonic factors $N_i$ values may be possible for a given $i^{th}$ switching regulator. In this case, the software may allocate harmonic factor $N_i$ values so that as few switching regulators as possible share the same harmonic factor N value.

In step 320, the software issues commands to send the fundamental frequency $f_0$ to master clock 115. Master clock 115 then sends the master clock signal (having fundamental frequency $f_0$) to synchronization clocks 240a-k via master clock signal line 125.

Further to step 320, the software issues commands to send each of the harmonic factors $N_i$ to the respective synchronization clock 240i via harmonic allocation signal line 130.

In step 325, interference monitor 120 acquires switching interference spectra. In doing so, interference monitor 120 receives output signals from switching regulators 145a-k via output sensor signal line 150. Each output signal corresponds to the output of the each of switching regulator 145a-k. The output signals are in the time domain. Interference monitor 120 digitizes the output signals and respectively converts them into the frequency domain. Interference monitor 120 transfers the resulting frequency domain data to processor 110, which stores them in memory 112.

Further to step 325, interference monitor 120 receives an RF signal from sensing antenna 155, digitizes the sensing antenna RF signal, and converts the RF signal into the frequency domain. Interference monitor 120 transfers the resulting frequency domain RF data to processor 110, which stores it in memory 112. Processor 110 may combine the frequency domain data from each of the switching regulators 145a-k and sensing antenna 155 into a single set of frequency domain data.

In decision step 330, the software compares the frequency domain data from each of the switching regulators 145a-k and from sensing antenna 155 with the frequency ranges associated with the retrieved spectral regions of interest to determine if there is overlap, that is, whether any of switching regulators 145a-k produces switching interference with spectral components (either fundamental or harmonic) within a spectral region of interest. The fundamental spectral component corresponds to the clock frequency of a given one of switching regulators 145a-k.

As mentioned earlier, the spectral regions of interest, as stored in memory 112, may include permissible noise amplitudes. If this is the case, the software determines if any frequency domain data from the switching regulators 145a-k and from sensing antenna 155 overlaps with a spectral region of interest. If there is overlap, the software determines if the overlapping frequency domain data has any amplitudes above the permissible noise amplitude. If none of the overlapping frequency domain data has an amplitude above the permissible noise amplitude, then software considers there to be no overlapping frequency domain data.

If it is determined that there is no overlap between the frequency domain data of the switching regulators 145a-k and the various spectral regions of interest (i.e., that there is no switching interference), the software proceeds along the "no" path out of decision step 330. However, if any switching interference is detected, the software proceeds along the "yes" path out of decision step 330.

In decision step 335, the software determines if the spectral regions of interest can be avoided by re-allocating harmonic factors $N_i$. In doing so, the software may examine the frequency domain data individually acquired from each of the switching regulators 145a-k (in step 325) to identify which of the switching regulators 145a-k generates interference within the spectral region of interest. Since the fundamental frequency $f_0$ and the harmonic factors $N_{l-k}$ of the switching regulators 145a-k are known, the software may then identify the harmonic factors $N_i$ that correspond to the identified switching interference. The software determines if, for each of the switching regulators 145 a-k that causes switching interference, it is possible to select a new harmonic factor $N_i$ that results in a new clock frequency $N_i \cdot f_0$ within its corresponding operating frequency range. In doing so, the software may try a range of harmonic factors $N_i$ in the vicinity of the previously-selected harmonic factor. If the result is positive (the new $N_i \cdot f_0$ is within the corresponding operating frequency range), the software may proceed along the "yes" branch of decision step 335 to step 315, along with the new harmonic factor $N_i$, and repeats steps 315-330.

If the result of decision step 335 is negative (no new $N_i \cdot f_0$ is within the corresponding operating frequency range), then the software proceeds along the "no" branch of step 340. Accordingly, a new fundamental frequency $f_0$ is selected in a subsequent iteration of steps 310-330.

The loops respectively formed by steps 315-335 and steps 310-335 may be iterated until there is no switching interference within the spectral regions of interest. In this case, the software proceeds along the "no" path of step 330 and completes.

When exemplary process 300 is complete, each of switching regulators 145a-k receives a clock signal (via clock signal lines 142a-k) that has a switching frequency within its respective operating frequency range. The switching interference generated by each of switching regulators 145a-k, including its respective fundamental and harmonic components, is such that substantially none of the components occur within a spectral region of interest.

As used herein, to have substantially no switching interference within a spectral region of interest includes the case in which one or more components occurs within a spectral region of interest, but at an amplitude that is acceptably low.

One of ordinary skill will readily recognize that variations to systems 100 and 200 above are possible and within the scope of the invention. For example, process 300 may be performed as part of a factory configuration process. In this case, interference monitor 120, sense antenna 155, and output sensor signal line 150 may be part of a factory calibration and configuration apparatus. In this example, system 100 (apart from interference monitor 120, sense antenna 155, and output sensor signal line 150) may be integrated into an electronic system or device. When process 300 is performed, resulting fundamental frequency $f_0$ and harmonic factors $N_{l-k}$ are stored in memory 112 as configuration data that is retrieved as system 100 starts up.

In another variation, harmonic allocation signal 130 may include a bus of k lines, one per synchronization clock 140/240a-k. Alternatively, harmonic allocation signal 130 may be a single serial line, in which each of the synchronization clocks 140/240a-k may be independently addressable, in which case processor 110 may individually set the $N_i$ harmonic factor for each synchronization clock 140/240a-k.

In another variation of the present invention, systems 100 and 200 may be combined such that some of the synchronization clocks may divide the fundamental frequency $f_0$ by the harmonic factor N and some of the synchronization clocks multiply the fundamental frequency $f_0$ by the harmonic factor N.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. An electronic system, comprising:
a plurality of switching regulators;
a plurality of synchronization clocks connected to the plurality of switching regulators;

a master clock connected to the plurality of synchronization clocks, the master clock having a fundamental frequency,
wherein each of the plurality of synchronization clocks has a harmonic factor of the fundamental frequency;
an interference monitor that detects a switching interference frequency and determines a spectral region of interest based on the switching interference frequency; and
a processor which sets the fundamental frequency based on the spectral region of interest.

2. The electronic system of claim 1, wherein the processor is connected to the plurality of synchronization clocks and to the master clock.

3. The electronic system of claim 2, wherein the interference monitor is connected to the processor and to the plurality of switching regulators.

4. The electronic system of claim 1, further comprising an antenna connected to the interference monitor.

5. The electronic system of claim 1, wherein the processor comprises a computer readable medium encoded with a program for selecting the fundamental frequency and the harmonic factors, wherein each of a corresponding plurality of clock frequencies is within an operating frequency range corresponding to each of the plurality of switching regulators.

6. The electronic system of claim 1, wherein each of the synchronization clocks comprise digital dividers that divide the fundamental frequency by its corresponding harmonic factor.

7. The electronic system of claim 1, wherein each of the synchronization clocks comprise digital multipliers that multiply the fundamental frequency by its corresponding harmonic factor.

8. A system for synchronizing a plurality of switching regulators, comprising:
means for selecting a master clock frequency by detecting a switching interference frequency and then determining a spectral region of interest based on the switching interference frequency;
means for selecting a plurality of harmonic factors based on the selected master clock frequency corresponding to the plurality of switching regulators; and
means for applying a plurality of clock signals based on the selected plurality of harmonic factors to the corresponding plurality of switching regulators, wherein the master clock frequency and the plurality of harmonic factors are selected so that substantially no switching interference occurs within the spectral region of interest.

9. An electronic system, comprising:
a plurality of switching regulators;
a plurality of synchronization clocks coupled to the plurality of switching regulators;
a master clock coupled to the plurality of synchronization clocks, the master clock having a fundamental frequency, wherein each of the plurality of synchronization clocks has a harmonic factor of the fundamental frequency;
an interference monitor that detects a switching interference frequency; and
a processor which sets the fundamental frequency of the master clock and the harmonic factor of each of the plurality of synchronization clocks to control the switching interference frequency based on a spectral region of interest.

10. The electronic system of claim 9, wherein the processor is coupled to the plurality of synchronization clocks and to the master clock.

11. The electronic system of claim 10, wherein the interference monitor is coupled to the processor and to the plurality of switching regulators.

12. The electronic system of claim 9, further comprising an antenna coupled to the interference monitor.

13. The electronic system of claim 9, further comprising:
a computer readable medium encoded with a program for selecting the fundamental frequency and the harmonic factors, wherein each of a corresponding plurality of clock frequencies is within an operating frequency range corresponding to each of the plurality of switching regulators.

14. The electronic system of claim 9, wherein each of the synchronization clocks comprise digital dividers that divide the fundamental frequency by its corresponding harmonic factor.

15. The electronic system of claim 9, wherein each of the synchronization clocks comprise digital multipliers that multiply the fundamental frequency by its corresponding harmonic factor.

16. A system for synchronizing a plurality of switching regulators, comprising:
means for detecting a switching interference frequency;
means for selecting a master clock frequency to control the switching interference frequency based on a spectral region of interest;
means for selecting a plurality of harmonic factors of the selected master clock frequency based on the spectral region of interest and the switching interference frequency, the plurality of harmonic factors corresponding to the plurality of switching regulators; and
means for applying a plurality of clock signals based on the selected plurality of harmonic factors to the corresponding plurality of switching regulators, wherein the master clock frequency and the plurality of harmonic factors are selected such that substantially no switching interference occurs within the spectral region of interest.

17. The system of claim 16, further comprising an antenna for detecting the switching interference frequency.

18. The system of claim 16, further comprising:
a computer readable medium encoded with a program for selecting the master clock frequency and the plurality of harmonic factors, wherein each of a corresponding plurality of clock frequencies is within an operating frequency range corresponding to each of the plurality of switching regulators.

19. The system of claim 16, wherein the means for applying a plurality of clock signals comprise means that divide the master clock frequency by its corresponding harmonic factor.

20. The system of claim 16, wherein the means for applying a plurality of clock signals comprise means that multiply the master clock frequency by its corresponding harmonic factor.

* * * * *